Patented Mar. 23, 1926.

1,578,139

UNITED STATES PATENT OFFICE.

WALTER KIRCHNER, OF GRUNAN, NEAR BERLIN, GERMANY, ASSIGNOR TO CHEMISCHE FABRIK GRÜNAN LANDSHOFF & MEYER AKTIENGESELLSCHAFT, OF GRUNAN, NEAR BERLIN, GERMANY.

PROCESS FOR PREPARING CEMENT.

No Drawing. Application filed February 1, 1924. Serial No. 690,088.

*To all whom it may concern:*

Be it known that I, WALTER KIRCHNER, citizen of the German Republic, residing at Grunan, near Berlin, Germany, have invented new and useful Improvements in a Process for Preparing Cement, of which the following is a specification.

My invention relates to improvements in the process of preparing cement and its mixtures with other materials and its object is to improve the qualities of the cement and its mixtures.

For most building constructions carried out with cement it is desirable that the cement should have great compressive and tensile strength and should be impermeable to water. This is only possible by employing cement of the very best quality with not too large quantities of filling materials.

In view of the great cost of cement, it is therefore desirable to have means available to improve the properties of the cement as far as possible, in order to attain the same good effect with smaller quantities of it.

I have ascertained that certain and definite products of decomposition of albumen (including albuminoids) are excellent agents to increase the strength and impermeability of the cement and all mixtures of which cement is a constituent. Only comparatively small quantities of this product are required, which are preferably added to the water which is mixed with the cement. The quantity of the added product depends upon the quality of the cement to be produced and will be larger if a better quality of the cement is to be produced. I can also employ the albumen decomposition products in the dry state. In U. S. Patents 511,879 and 523,658 there is disclosed a process for retarding the quick setting and to secure a strengthening action of cement by adding a liquor obtained by the fermentation and decomposition of organic matter in water and mixing the resultant liquor with lime. It is quite uncertain what kind of albuminous products of decomposition are formed hereby and therefore the process lacks the element of definiteness.

The object of the present process is to produce quite definite albuminous products of decomposition, viz—a mixture of protalbinic and lysalbinic acids which are well known to scientists, and which mixture can always be repeatedly made with equal composition and equal properties in improving cement and the like.

The following example will show how greatly the said products of decomposition of albumen influence the properties of the cement. A diluted aqueous solution of a mixture of a solution of crude protalbinic and lysalbinic acids, is first produced by heating albuminous substances with alkali solutions. The production of such a solution of protalbinic and lysalbinic acids is, for instance, described in the German Letters Patents No. 311542 and 341264. Of this solution 5%, calculated for the water-free substance, is added to the water intended to be mixed with the cement. The water, containing 5% of this solution is utilized for mixing a cement mortar, for instance in the proportion of 1:3, and molded into the prescribed standard testing shape. The test shows that the tensile strength of the cement mortar on the seventh day is approximately 11% higher than that of a mortar which has been prepared in exactly the same manner but without an addition of the said decomposition products. The compressive strength after seven days increases by 28%. The cement mortar without the addition according to this invention allows within one hour at 0.3 atm. approximately 300 g. water to pass through, while the cement mortar prepared with the addition according to this invention is absolutely watertight under the same conditions.

It will be readily understood that my invention is not limited to any particular percentage of albumen decomposition products but what I claim and desire to secure by Letters Patent is:

1. The process for improving the qualities of cement, which consists in adding to it a mixture of a solution of protalbinic and lysalbinic acids.

2. The process of improving the qualities of cement, which consists in heating albuminous substances with alkali solutions and adding a diluted watery solution of the said albumen decomposition product to the cement.

3. The process of producing cement mortar, which consists in stirring the mortar with water containing a solution of protalbinic and lysalbinic acids.

In testimony whereof I affix my signature.

WALTER KIRCHNER.